(12) United States Patent
Siegl (10) Patent No.: US 9,586,713 B2
(45) Date of Patent: Mar. 7, 2017

(54) PREFORM FOR PRODUCING PLASTIC CONTAINERS IN A STRETCH-BLOW-MOULDING PROCESS

(71) Applicant: ALPLA WERKE ALWIN LEHNER GMBH, Hard (AT)

(72) Inventor: Robert Siegl, Dornbirn (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 0 days.

(21) Appl. No.: 14/643,227

(22) Filed: Mar. 10, 2015

(65) Prior Publication Data
US 2015/0191269 A1 Jul. 9, 2015

Related U.S. Application Data

(63) Continuation of application No. PCT/EP2013/002621, filed on Sep. 2, 2013.

(30) Foreign Application Priority Data

Sep. 10, 2012 (CH) ........................ 1648/12
Dec. 17, 2012 (CH) ........................ 2838/12

(51) Int. Cl.
*B29C 49/08* (2006.01)
*B29C 49/02* (2006.01)
(Continued)

(52) U.S. Cl.
CPC ............ *B65D 1/0246* (2013.01); *B29B 11/08* (2013.01); *B29B 11/14* (2013.01);
(Continued)

(58) Field of Classification Search
CPC ..................... B29B 11/08; B29B 11/14; B29B 2911/14013; B29B 2911/14026;
(Continued)

(56) References Cited

U.S. PATENT DOCUMENTS

2010/0178148 A1 7/2010 Forsthoevel et al.
2010/0314348 A1 12/2010 Zoppas et al.

FOREIGN PATENT DOCUMENTS

DE 10 2007 033 621 A1 1/2009
WO WO 2006/027092 A1 3/2006
WO WO 2009/053921 A1 4/2009

OTHER PUBLICATIONS

International Search Report (PCT/ISA/210) mailed on Oct. 8, 2013, by the European Patent Office as the International Searching Authority for International Application No. PCT/EP2013/002621.
(Continued)

*Primary Examiner* — Yan Lan
(74) *Attorney, Agent, or Firm* — Buchanan Ingersoll & Rooney PC (57) ABSTRACT

A preform is disclosed for the production of plastic containers, for example plastic bottles, in a stretch-blow-molding method. The preform can include an elongated preform body having a closed longitudinal end and which connects on an opposite longitudinal end to a neck section having a pour opening, the neck section having an outside wall with a fastening means. A rotating flange at a transition from the preform body to the neck section, wherein at least a portion of the rotating flange is annular and radially extends above an outside wall of the preform body. A peripheral annular groove can extend obliquely from a base of the annular groove to the outside wall of the neck section forming a circumferential inner collar, and wherein the inner collar the direction of the preform body, extends axially above the annular groove and extends into an inside wall of the preform body.

17 Claims, 4 Drawing Sheets

(51) Int. Cl.
*B65D 1/02* (2006.01)
*B29B 11/08* (2006.01)
*B29B 11/14* (2006.01)
*B29C 49/06* (2006.01)
*B29C 49/00* (2006.01)
*B29C 49/12* (2006.01)
*B29D 22/00* (2006.01)
B29K 23/00 (2006.01)
B29K 25/00 (2006.01)
B29K 27/06 (2006.01)
B29K 67/00 (2006.01)

(52) U.S. Cl.
CPC .......... *B29C 49/0078* (2013.01); *B29C 49/06* (2013.01); *B29C 49/12* (2013.01); *B29D 22/003* (2013.01); *B29B 2911/1404* (2013.01); *B29B 2911/14013* (2013.01); *B29B 2911/14026* (2013.01); *B29B 2911/14033* (2013.01); *B29B 2911/1444* (2013.01); *B29B 2911/14106* (2013.01); *B29B 2911/14133* (2013.01); *B29B 2911/14326* (2013.01); *B29B 2911/14333* (2013.01); *B29B 2911/14413* (2013.01); *B29B 2911/14473* (2013.01); *B29B 2911/14606* (2013.01); *B29B 2911/14633* (2013.01); *B29B 2911/14726* (2013.01); *B29K 2023/065* (2013.01); *B29K 2023/12* (2013.01); *B29K 2025/06* (2013.01); *B29K 2027/06* (2013.01); *B29K 2067/003* (2013.01); *Y10T 428/1397* (2015.01)

(58) Field of Classification Search
CPC ... B29B 2911/14033; B29B 2911/1404; B29B 2911/14106; B29B 2911/14133; B29B 2911/14326; B29B 2911/14333; B29B 2911/14413; B29B 2911/1444; B29B 2911/146; B29C 49/06; B29C 49/0078; B29C 49/12; B29K 2023/065; B29K 2023/12; B29K 2025/06; B29K 2027/06; B29K 2067/003; B29D 22/003; B65D 1/0246; Y10T 428/1397
See application file for complete search history.

(56) References Cited

OTHER PUBLICATIONS

Written Opinion (PCT/ISA/237) mailed on Oct. 8, 2013, by the European Patent Office as the International Searching Authority for International Application No. PCT/EP2013/002621.

PREFORM FOR PRODUCING PLASTIC CONTAINERS IN A STRETCH-BLOW-MOULDING PROCESS

RELATED APPLICATION(S)

This application claims priority as a continuation application under 35 U.S.C. §120 to PCT/EP2013/002621, which was filed as an International Application on Sep. 2, 2013 designating the U.S., and which claims priority to Swiss Application No. 1648/2012 filed in Switzerland on Sep. 10, 2012, and Swiss Application No. 02838/12 filed in Switzerland on Dec. 17, 2012. The entire contents of these applications are hereby incorporated by reference in their entireties.

FIELD

The disclosure relates to a preform without a support ring for producing plastic containers in a stretch-blow-molding method.

BACKGROUND INFORMATION

A large number of plastic bottles and similar plastic containers that are now used can be produced in a stretch-blow-molding process. In this method, a so-called preform of an elongated, tube-like shape, which can have a base on one longitudinal end and a neck section with formed threaded sections or the like on the other longitudinal end, is inserted into a mold cavity of a blow mold and blown in through a medium that is injected with overpressure. In this case, the preform is additionally elongated in the axial direction with an elongated mandrel that is run in through the neck opening. After the elongation/blow-molding process, the finished plastic container is demolded from the blow mold.

The preform can be produced in a separate injection-molding method before the stretch-blow-molding process. The preforms can also be produced in an impact-extruding method or else by extrusion blow-molding process. In the so-called single-stage stretch-blow-molding process, the preform can be reshaped immediately after its production to form a plastic container with no cooling or storage in between. In most cases, however, the plastic containers can be produced in a two-stage method, in which in a separate method, first the preforms are produced, cooled, and intermediately stored for later use. The production of the plastic containers can be carried out in a manner separated in space and time in a separate stretch-blow-molding process. In this later stretch-blow-molding process, the preforms can be heated again in order to produce plastic bottles therefrom. For example, using infrared radiation, a desired temperature profile, which can be used for the stretch-blow-molding process, can be set via the axial and/or radial extension of the preform. After the preform is inserted into the mold tool, the latter can be radially formed by means of a gas that can be injected with overpressure, and in this case stretched in axial direction with a bar. Then, the finished plastic container can be demolded.

A large number of the known preforms have a support ring, which can separate the elongated preform body from the neck section. The support ring can be used to transport the preform and the plastic container produced therefrom. In the stretch-blow-molding device, the preform can be supported via the support ring on the mold tool, so that only the preform body projects into the mold cavity. The neck section can no longer be changed during the stretch-blow-molding process. A so-called snap ring, which can serve as a counter bearing for a safety cap on the finished stretch-blow-molded plastic container, can be formed between the support ring and the threaded sections made on the neck section. Such safety caps are known, for example, from beverage bottles. When unscrewing the safety cap, an annular section of the safety cap, for which the snap ring forms a counter bearing, at least partially separates from the other cap. As a result, it is indicated to the consumer, even in the case of a reclosed bottle, that the bottle has already been opened once.

In the production of mass-produced articles, such as, for example, plastic bottles made of polyethylene terephthalate (PET), the amount of material used represents a decisive factor for competitiveness and ecological balance. Because of the very high number of pieces, in which plastic bottles can be produced, reductions in material weight in the decigram range can very quickly lead to a savings in material in the ton range. Therefore, major efforts were undertaken in the past to decrease the material weight of the preforms for plastic bottles, for example, PET bottles. With the known preforms, the optimum material weight was believed to have been reached, and the plastic bottles produced from the preforms had reached the necessary mechanical strengths and temperature stabilities. In the previous efforts to reduce the material weight, multiple modifications of the stretch-blow-molding plants and the bottling plants were necessary. However, this can be unsatisfactory state both from the standpoint of the operator of stretch-blow-molding plants and from the standpoint of the filler of plastic containers produced from the preforms.

In WO 2006/027092 A1, for example, a preform for a wide-mouth container, which can have a neck section that is greatly widened in diameter relative to the preform body, is described. In the case of this preform, a support ring can be eliminated. The support of the preform relative to the mold tool can be done via a circumferential annular collar at the transition from the preform body to the widened neck section. For the transport of the preform and the plastic container produced from the preform, specially designed grippers, whose gripping surface can be matched to the peripheral contour of the neck section projecting from the mold tool, can be necessary. Specifically, the preform can have a savings of material by eliminating the support ring. In addition, the preform can be designed for the production of wide-mouth containers, however, for the transport of the preform and the plastic container produced from the preform, specifically designed grippers can be used. The grippers should engage in a threaded structure that can be arbitrarily aligned, without colliding with the threading. In addition, the preform picked up by the grippers should not be changed with respect to the orientation of its longitudinal axis in order to avoid an inclined position of the preform. With respect to the fact that the grippers engage two areas of the neck area that are opposite to one another and can very easily set a tilting moment depending on the axial position of the contact point, it is immediately clear that grippers that are suitable for the known preform can have a relatively complex structure and therefore greatly increase the overall cost of the equipment.

After their production, preforms can be decanted randomly in large containers, such as, for example, cartons, bags, mesh crates, octabins, etc., and transported. For further processing in the stretch-blow-molding method, the preforms can be filled from the containers into a hopper upstream from a stretch-blow-molding device and separated. The preforms pass through the hopper onto an ascending conveyor, by means of which they are transported intermittently or continuously in small quantities to a roll sorter. In the roll sorter, the preforms can be oriented corresponding to their center of gravity, in such a way that they can be suspended in a slot, with the preform body pointing downward and can slip individually against the stretch-blow-molding device. The preforms can be held via the support ring or a comparable radial projection between the neck section and the perform body in the roll sorter. If the center of gravity of the preform clearly lies below the support ring or the radial projection in the area of the preform body, the preforms can be correctly aligned and leave the roll sorter with the preform body pointing downward. In order therefore to achieve a correct alignment of the preforms, the known preforms can be in many cases designed with a comparatively long preform body. However, with stretch-blow-molding, this can result in a length-stretch ratio, which can have a negative effect on the strength of the stretch-blow-molded plastic container. In order to impart the necessary strength to the stretch-blow-molded plastic container, in contrast, the desire therefore exists for preforms that have a shorter preform body. However, the closer the center of gravity of the preform to the support ring or the radial projection, the greater the risk that such preforms can wind up in the wrong position. This can also result in problems, for example, even in the case of preforms with a large opening diameter and long outside threadings as well as with a small, light preform body. In many cases, therefore, at the output of the roll sorter, systems can be provided, with which the correct orientation of the preforms can be examined. Misoriented preforms can be removed and fed again to the roll sorter. If the number of erroneously oriented preforms is too large, however, most sorting systems collapse.

SUMMARY

In accordance with an exemplary embodiment, a preform is disclosed for the production of plastic containers in a stretch-blow-molding process, the preform comprising: an elongated preform body having a closed longitudinal end and an opposite longitudinal end connected to a neck section having a pour opening, the neck section having an outside wall with a fastening means for clamping of a closing part equipped with corresponding engagement means; a rotating flange at a transition from the preform body to the neck section, wherein at least a portion of the rotating flange is annular and radially extends above an outside wall of the preform body; and a peripheral annular groove, which is bound by the flange and in a direction of the fastening means by an outer collar, wherein the outer collar extends obliquely from a base of the annular groove to the outside wall of the neck section, which forms a circumferential inner collar, and wherein at least a portion of the inner collar is annular on an inside wall of the neck section, and wherein the inner collar in the direction of the preform body extends axially above the annular groove and into an inside wall of the preform body.

In accordance with an exemplary embodiment, a method is disclosed of producing a plastic container with a preform in a stretch-blow-molding process, the preform including an elongated preform body having a closed longitudinal end and an opposite longitudinal end connected to a neck section having a pour opening, the neck section having an outside wall with a fastening means for clamping of a closing part equipped with corresponding engagement means, a rotating flange at a transition from the preform body to the neck section, wherein at least a portion of the rotating flange is annular and radially extends above an outside wall of the preform body, and a peripheral annular groove, which is bound by the flange and in a direction of the fastening means by an outer collar, wherein the outer collar extends obliquely from a base of the annular groove to the outside wall of the neck section, which forms a circumferential inner collar, and wherein at least a portion of the inner collar is annular on an inside wall of the neck section, and wherein the inner collar the direction of the preform body extends axially above the annular groove and into an inside wall of the preform body, the method comprising: producing the preform in a two-stage stretch-blow-molding process, in which first the preform is produced in a separate process; and reshaping the preform in a stretch-blow-molding method at a different time and/or place to form the plastic container.

In accordance with an exemplary embodiment, a plastic container is disclosed produced in a stretch-blowing molding method, the stretch-blowing molding method including a two-stage stretch-blowing-method using a preform, the preform including the preform including an elongated preform body having a closed longitudinal end and an opposite longitudinal end connected to a neck section having a pour opening, the neck section having an outside wall with a fastening means for clamping of a closing part equipped with corresponding engagement means, a rotating flange at a transition from the preform body to the neck section, wherein at least a portion of the rotating flange is annular and radially extends above an outside wall of the preform body, and a peripheral annular groove, which is bound by the flange and in a direction of the fastening means by an outer collar, wherein the outer collar extends obliquely from a base of the annular groove to the outside wall of the neck section, which forms a circumferential inner collar, and wherein at least a portion of the inner collar is annular on an inside wall of the neck section, and wherein the inner collar in the direction of the preform body extends axially above the annular groove and into an inside wall of the preform body, the plastic container comprising: a neck section having a pour opening and a container body that is sealed to a container base, wherein the plastic container has a center of gravity (S) that is arranged in the container body such that a first straight line (g), which is perpendicular to a platform made in the container base and on which the center of gravity (S) lies, with a second straight line (h), which is determined by a tipping point (T) and the center of gravity (S) that are predetermined in an area of an outer edge of the container base, forming an angle ($\delta$) with one another that is greater than 12°.

BRIEF DESCRIPTION OF THE DRAWINGS

The disclosure is explained below with reference to the exemplary embodiments shown in the drawings. In the drawings.

DETAILED DESCRIPTION

In accordance with an exemplary embodiment, a preform is disclosed for the production of plastic containers, for example, plastic bottles, in a stretch-blow-molding method, which can reduce the number of erroneously-oriented preforms in sorting and separating devices, for example, in roll sorters. In addition, the amount of material used for the preform can be reduced. The preform can be configured to allow the production of plastic containers with standardized smaller pour openings. In this case, modifications to the stretch-blow-molding plants and to the bottling plants can be avoided. In addition, specially designed grippers for the preforms and the plastic containers produced therefrom can be eliminated. The necessary mechanical strengths and the thermal stability of the plastic containers manufactured from the preforms can remain. In addition, the preform can mass-produce with normal production methods, for example, an injection-molding method, an impact-extruding method, or an extrusion-blow-molding method.

In accordance with an exemplary embodiment, a preform is disclosed without a support ring for the production of plastic containers, for example plastic bottles, in a stretch-blow-molding method.

In accordance with an exemplary embodiment, a preform is disclosed without a support ring for the production of plastic containers, for example, plastic bottles, in a stretch-blow-molding method that can have an essentially elongated preform body whose one longitudinal end is made in a closed manner. On the opposite longitudinal end of the preform, the preform body connects to a neck section that can be provided with a pour opening, on whose outside wall fastening means for positive clamping of a closing part equipped with corresponding engagement means are made. At the transition from the preform body to the neck section, a rotating flange that can be annular at least in some places and that can radially extend above an outside wall of the preform body can be molded-on. In one area between the flange and the fastening means, the neck section of the preform can have a peripheral annular groove. The annular groove can be bounded by the flange and in the direction of the fastening means by an outer collar, which can extend from a base of the annular groove obliquely to the outside wall of the neck section. The oblique outer collar can form a circumferential inner collar that is annular at least in some places on an inside wall of the neck section, which collar, seen in the direction of the preform body, can extend axially above the annular groove and can extend essentially without undercuts into an inside wall of the preform body.

At the transition from the preform body to the neck section, a rotating flange that can be annular at least in some places and that can radially extend above an outside wall of the preform body can be molded-on. In an area between the flange and the fastening means, the neck section of the preform can have a peripheral annular groove. The annular groove can be bounded by the flange and in the direction of the fastening means by an outer collar, which can extend from a base of the annular groove obliquely to the outside wall of the neck section. On an inside wall of the neck section, the oblique outer collar can form a circumferential inner collar that is annular at least in some places and that, seen in the direction of the preform body, can extend axially above the annular groove and can extend essentially without undercuts into an inside wall of the preform body.

Like known preforms, for the production of wide-mouth containers, for example wide-mouth bottles, in the stretch-blow-molding method, the disclosed preform can also dispense with a support ring, which can be used for the transport of the preform, for its support in the mold tool, for the transport of the stretch-blow-molded plastic bottle or in its clamping or support during the application of the closure in the bottling plant. Unlike known preforms, the disclosed preform does not use a specially designed support surface on the outside wall of the preform. Instead, a rotating flange that can be annular at least in some places and molded-on at the transition from the preform body to the neck section can be used to support the preform on the mold tool of the stretch-blow-molding device. In addition, the flange can be used for positive axial clamping of a closing part. In this connection, the flange can serve as a counter bearing for the separable safety band of a screw cap or in the case of oil bottles or the like for clamping the lower part of the hinge closure that is usually used. Consequently, the flange can be designed as a snap ring for closing parts. The mold tool should not be reconfigured, since the overlap of the flange over the outside periphery of the preform body can be sufficiently large. For example, the radial overlap of the flange can be, for example, 0.5 mm up to 20 mm. The flange can be designed in an annular manner all the way around. It can also be designed like a segment, however. Its peripheral contour can be circular, but it can also be non-circular and can be designed as, for example, a polygon.

Material can be saved by eliminating the support ring. A common 38 mm neck with a support ring for milk or juice bottles weighs between, for example, approximately 3.5 g and 5.5 g. Despite identical wall thickness, the disclosed preform can be between, for example, approximately 1 g and 2 g lighter than known preforms. In addition, because the preform body of the disclosed preform can be made smaller in span under the flange than a preform body under a support ring, here, in addition, it can be lightened by approximately another gram. Thus, because of the disclosed preform, a weight reduction of, for example, approximately 25% to 50%, for example, 30%, relative to known preforms with the same wall thickness can be achieved.

The economic efficiency of the production of preforms in the injection-molding method, in the extrusion method, or in the impact-extrusion method can be closely connected to the distance between the individual cavities. The maximum outside diameter of a known preform can be determined by the support ring. The maximum outside diameter can be reduced by the elimination of the support ring, and more cavities can be placed in the injection mold, the extrusion mold, or the pressure mold.

The peripheral annular groove in the area between the flange and the fastening means provided on the neck section can allow the preform to be grasped with known transport systems, for example, pliers or the like, and to transport the preform. A specially designed gripper can thus be eliminated. The annular groove can be bounded by the flange and in the direction of the fastening means by an outer collar that can run obliquely to the outside wall of the neck section. On an inside wall of the neck section, the outer collar can form a circumferential inner collar that can be annular at least in some places and that, seen in the direction of the preform body, can extend axially above the annular groove and can extend essentially without undercuts into an inside wall of the preform body. The annular groove is thus not a furrow or the like that is molded-on into the outside wall of the neck section and that abruptly and locally leads in a limited manner to a reduction in the wall thickness of the neck section. Rather, the tapering of the neck section results in a reduction in the outside diameter of the neck section and the preform body after that, which can result in a not-inconsiderable reduction in the use of material.

The special forming of the oblique outer collar together with the inner collar arranged above the annular groove can also help ensure a problem-free production of the preform, for example, in an injection-molding method. Because of the special forming, abrupt, locally limited constrictions can be avoided, which constrictions can lead to problems in the injection molding of the preform, by preventing sufficient material from passing into the neck section with the threaded sections during the filling process and during the resqueezing for shrinkage compensation. As a result thereof, shrink marks, contraction cavities or incompletely injected preform necks can occur. The design according to the disclosure of the collar area that is to be widened obliquely in the direction of the preform opening and that is arranged above the annular groove, however, can help ensure that an adequate material flow during injection-molding, and also, moreover, can help promote a uniform hardening process, and a "freezing" of individual areas of the preform with overly greatly reduced wall thicknesses can be prevented.

The preform can be produced in a known way, for example in the injection-molding method. In accordance with an exemplary embodiment, by eliminating the support ring and by tapering in the shape of the peripheral annular groove in the neck section and the reduction in the outside diameter, a not-inconsiderable amount of material can be saved. The design according to the disclosure of the preform for the stretch-blow-molding method is not limited to the production of wide-mouth containers unlike the preforms of the state of the art, but rather it also allows the production of plastic containers, for example, plastic bottles, with commercially available opening diameters of, for example, approximately 32 mm to approximately 34 mm.

In accordance with an exemplary embodiment, by eliminating the support ring and supporting the preform on the blow mold tool over the radially-projecting flange, the length of the neck section, which projects from the mold tool during the stretch-blow-molding method can also be reduced, and an additional amount of material can be saved.

In accordance with an exemplary embodiment, the preform configured according to the disclosure can have a center of gravity that can be arranged in the area of the preform body and can have a distance that is greater than, for example, 6 mm from a transition from the neck section to the preform body. By the center of gravity of the preform being moved in the direction of the preform body, the probability of an incorrect or mis-positioning of the preform at the output of a sorting system, for example a roll sorter, can be considerably reduced. For example, this can apply to preforms with larger neck diameters and shorter preform bodies. When taking into account the standard for the arrangement of the center of gravity of the preform, its wall thickness in the neck section and/or in the preform body can be further reduced as long as the necessary mechanical and thermal strengths of the plastic container that is stretch-blow-molded from the preform remains. In exemplary embodiments of the preform, the distance of center of gravity of the preform from the transition of the neck section to the preform body can be, for example, greater than 9 mm, for example, greater than 12 mm.

In accordance with an exemplary embodiment, the preform can be designed without a support ring can have an essentially elongated preform body, whose one longitudinal end can be sealed to a base. On an opposite longitudinal end of the preform body, the preform body can connect to a neck section that can be provided with a pour opening, a neck section on whose outside wall fastening means can be made for positive clamping of a closing part equipped with corresponding engagement means.

Relative to the outside wall of the neck section, the annular groove can have a radial depth that can be, for example, approximately 0.1 mm to approximately 1.1 mm, for example, approximately 0.8 mm. As a result, the preform can also be gripped and transported with the known transport systems, for example, pliers or the like, in the case of the usual manufacturing tolerances, deformations, and vibrations on the stretch-blow-molding machine.

By the annular groove on the outside wall of the neck section having a maximum axial width of, for example, approximately 0.3 mm to approximately 3 mm, for example, approximately 1.5 mm, the positioning accuracies of the known transport systems can be sufficient to be able to securely grasp the preform. At these widths of the annular groove, the axial length of the neck section can also be kept short.

The neck section of the preform can have a wall thickness, measured at the fastening means, which can be, for example, approximately 0.4 mm to approximately 2 mm. The fastening means can be designed, for example, as a through threading, as threaded sections, as guide grooves or guide projections of a bayonet closure or the like. It is understood that threadings and threaded sections can be provided as both positive structures, rising above the outside wall of the neck section, and negative structures, turning in relative to the outside wall of the neck section. In this case, the wall thickness of the neck section can be measured adjoining the respective structure of the fastening means. In the case of a threading or threaded sections, the wall thickness can be measured between the threaded passages or threaded sections, whereas in the case of guide grooves or guide projections, wall thickness can be measured adjacent to the respective structure.

Because of the annular groove, the neck section can have a wall thickness that differs by not more than ±50% from the wall thickness of the neck section at the fastening means. In accordance with an exemplary embodiment, the wall thickness based on the annular groove essentially corresponds to that at the fastening means. A wall thickness measured at the inner collar running above the annular groove can correspond to, for example, about 0.5× (0.5 times) to 1.5× (1.5 times) the wall thickness of the neck section at the fastening means. In accordance with an exemplary embodiment, the wall thickness of the neck part at the inner collar made above the annular groove can correspond to the wall thickness of the neck section at the fastening means. A section of the preform body connecting to the radially-projecting flange can have a wall thickness that can differ, for example, by no more than ±50% from the wall thickness of the neck section at the fastening means. The wall thickness of the section of the preform body connecting to the flange should essentially correspond to the wall thickness of the neck section at the fastening means. By these dimensions of the preform, it can be relatively ensured that with injection-molding of the preform during the filling process and during the resqueezing for shrinkage compensation, sufficient material passes into the neck section with the threaded sections. As a result, shrink marks, contraction cavities or incompletely-injected preform necks can be avoided. In accordance with an exemplary embodiment, the wall thickness ratios promote a uniform hardening process, and a "freezing" of individual areas of the preform with overly greatly reduced wall thicknesses can be prevented. An exemplary embodiment of the preform calls for the wall thicknesses of the neck section at the fastening means, the inner collar and the section of the preform body that connects to the flange, essentially to correspond to one another. Such a preform can prove especially beneficial for the production in the injection-molding method, because the specially "structured" sections have a wall thickness that can be as uniform as possible. As a result, in the preform neck, which is not further reshaped, for example, radially and/or axially stretched, during the stretch-blow-molding process, weak points can be avoided, which can help allow the preform neck to be made as a whole with a smaller wall thickness and thus to save material.

In accordance with an exemplary embodiment, so that the preform that can be grasped by the transport means can be better centered in its position, the annular groove can be steadily tapered radially from the outside wall of the neck section inward toward the base of the annular groove. The steady, flowing transition to the wall of the neck section can prove beneficial for the production process of the preform in the injection-molding method, for example, for the uniformity of the hardening of the same or for its demolding, in which the flowing transition area from the outer collar to the outside wall can form a demolding tilt.

In accordance with an exemplary embodiment, the preform can have an inside wall that can be essentially without undercuts. As a result, the injection-molding process can be performed with a single core, which can have an immediately beneficial effect on the production costs of the preforms.

In accordance with an exemplary embodiment, the inner collar that is made in the interior of the preform neck and that extends above the annular groove can be designed in various ways. For example, the inner collar can form a radial surface or be configured in steps. In accordance with an exemplary embodiment, the inner collar can be designed as a cone surface. In the case of the stretch-blow-molding method, the cone surface can allow a seal between the blowing nozzle and the preform in the interior of the preform. By the sealing being able to be carried out in the interior of the preform, deformations of the neck section, for example, the front surface that can be bounded by the pour opening, can be avoided. In addition, as a result, any damage of the fastening means provided on the outside of the neck section can be prevented. The blowing nozzle can have a smaller diameter, because it no longer can have to occupy the neck section of the preform. The dimensioning of the blowing nozzle can be kept small in the preform designed according to the disclosure, even in the case of the production of plastic containers with larger diameters of the pour opening, which can have advantages relative to the design of the blowing nozzle, relative to the necessary pressing forces and also relative to the media pressures necessary for the stretch-blow-molding process. In accordance with an exemplary embodiment, because of the seal in the interior of the preform, the wall thickness in the neck section can be further reduced, which can leads to a not-inconsiderable amount of material saved, and which can have a beneficial effect on the unit costs of the plastic containers. In the case of multi-cavity molds, the seal in the interior of the preform can allow a limited arrangement of mold cavities, which also can have a beneficial effect on the production costs of the plastic containers that can be stretch-blow-molded from the preforms.

The sealing between the blowing nozzle and the disclosed preform can be carried out in the interior of the preform exclusively by an annular contact between the opening of the blowing nozzle and the inner collar having at least one cone surface. In addition, in accordance with an exemplary embodiment, additional sealing systems can be eliminated. In order to facilitate the sealing in the interior of the preform, the cone surface forms an angle, which can be, for example, approximately 100° to approximately 150°, with the inside wall of the neck section that extends essentially axially. An exemplary embodiment of the disclosure can provide that the inner collar can be designed as a single annular circumferential cone surface.

In accordance with an exemplary embodiment, for the production of the preform in an injection-molding method, it can be suitable when the inner collar extends parallel to the outer collar at least in some places, for example, even when the outer collar can have a stepped outside contour. An angle formed by the outer collar with an axis of the preform can be, for example, ±10° to ±60°.

As materials for the preform, all materials that are suitable for the injection-blow-molding method and the stretch-blow-molding method come into consideration. For example, these are PET, PET-G, HDPE, PP, PS, PVC, copolymers of the cited plastics, bioplastics, such as, for example, PEF, filled plastics, and mixtures of the above-mentioned plastics. The plastic or the plastic mixture can contain additives, catalysts, separating agents and lubricants, as well as dyes. In accordance with an exemplary embodiment, the preform can be produced from PET in an injection-molding method or in an impact-extruding method. In this connection, it can be insignificant whether all components of the plastics or the plastic mixtures or only a portion of these components can be obtained from renewable raw materials, and the remaining portion of the components can be obtained by, for example, petrochemistry.

By using a preform without a support ring that can be designed according to the disclosure, the overall costs for the production of plastic containers with any size opening diameters, for example, of plastic bottles, can be reduced in a stretch-blow-molding method. Unlike the preform without a support ring that are known, no specially designed transport means are necessary for transport and no modifications of the mold tools are necessary. In accordance with an exemplary embodiment, the shaping of the preform can result in considerable savings of material, which can be both economically and ecologically beneficial. In addition, the shifting of the center of gravity of the preform in the direction of the preform body achieved by the savings of material in the neck section can prove beneficial in the isolation and correct orientation of the preforms. As a result, lighter preforms or preforms with shorter preform bodies can also be correctly oriented. In addition, special feed systems for stretch-blow-molding plants can be eliminated.

The plastic containers produced from the preform, designed according to the disclosure, in the stretch-blow-molding method have mechanical and thermal properties, despite a savings of material, which can be comparable to those of plastic containers manufactured from known preforms. In accordance with an exemplary embodiment, the disclosed preform can be suitable for the production of plastic containers in a two-stage stretch-blow-molding method, in which first the preform can be produced in a separate process, for example by injection-molding, and then, at a different time and/or place, the preform can be reshaped in a stretch-blow-molding method to form a plastic container, for example, a plastic bottle. As a result, the production of the preforms, for example, in the injection-molding method, and the actual stretch-blow-molding method can be performed in each case under optimized conditions, whereby the different points in the cycle in the two different methods do not affect one another.

In accordance with an exemplary embodiment, a plastic container that can be stretch-blow-molded from a preform that can be designed according to the disclosure can have a neck section that can have a pour opening and a container body that can be sealed to a container base. The material distribution at the plastic container, for example, the material distribution between the neck section and the container body, can be set in such a way that the plastic container can have a center of gravity that can be arranged in the container body in such a way that an imaginary first straight line, which can be perpendicular to a platform made in the container base and on which the center of gravity lies, with a second straight line, which can be determined by a tipping point and the center of gravity that can be predetermined in the area of an outer edge of the container base, form an angle with one another that can be, for example, greater than 12°. In accordance with an exemplary embodiment of the plastic container, the angle formed by the first straight line and the second straight line can be, for example, greater than 16°. In an exemplary embodiment of the plastic container in which the angle formed by the first straight line and the second straight line can be, for example, greater than 20°.

The platform describes the portion of the container base on which the plastic container can be deposited, for example on a conveyor belt or a table. The tipping point in the outer area of the container base can be determined in that the empty container, when set on this tipping point, immediately tips over the bottle and does not return to the platform. Based on a selected bottle shape, the tipping point can be more or less far away from the imaginary straight line. In terms of this disclosure, the tipping point that is closest to the imaginary straight line is understood here. By the specific selection of the center of gravity of the plastic container, the risk is that the latter will not tip over so easily during transport to and into bottling plants. The plastic containers can be transported on conveyor belts, which do not always run evenly, but rather often also have slight slopes because of the intersecting conveyor belts. In addition, when starting and stopping the conveyor belts or in the case of directional changes of the transport, inertial forces create the risk that the plastic containers can tip over.

Finally, vibrations, contacts of the plastic containers below one another or else with guides and conductor rails arranged above the conveyor belts, can also lead to tipping moments that can result in a tipping of individual plastic containers in the case of an unfavorable arrangement of the center of gravity in a tipping. The shift of the center of gravity away from the neck part, further in the direction of the container base, promotes the stability of the plastic container. The angle of a first straight line, which can be perpendicular to the container base or to the base that supports the latter and runs through the center of gravity, and a second straight line, which runs through the center of gravity and a tipping point in the area of the container bottom, can be enlarged by the shift of the center of gravity and thus can improve the low center of gravity of the plastic container. In the case of most plastic containers, the first straight line can correspond to the center line of a container. The tipping point that lies on the second straight line usually corresponds to a point on an outermost boundary line of a platform of the container on the base, for example, the conveying surface of a conveyor belt.

In accordance with an exemplary embodiment, the plastic container can have a number of tipping points along its platform.

The embodiment of the plastic container according to the disclosure with a specific material distribution for shifting the center of gravity of the container can be beneficial, for example, also for the stability and the low center of gravity of plastic containers, plastic containers whose container bodies have a non-circular cross-section, for example an oval cross-section. By plastic containers in the neck section that are stretch-blow-molded from the preforms without support rings having less material and therefore a lower weight, the plastic containers can be designed lighter overall or have a container body that can have a greater length relative to the known plastic containers, without thus losing stability and impairing the low center of gravity.

Figure 1:
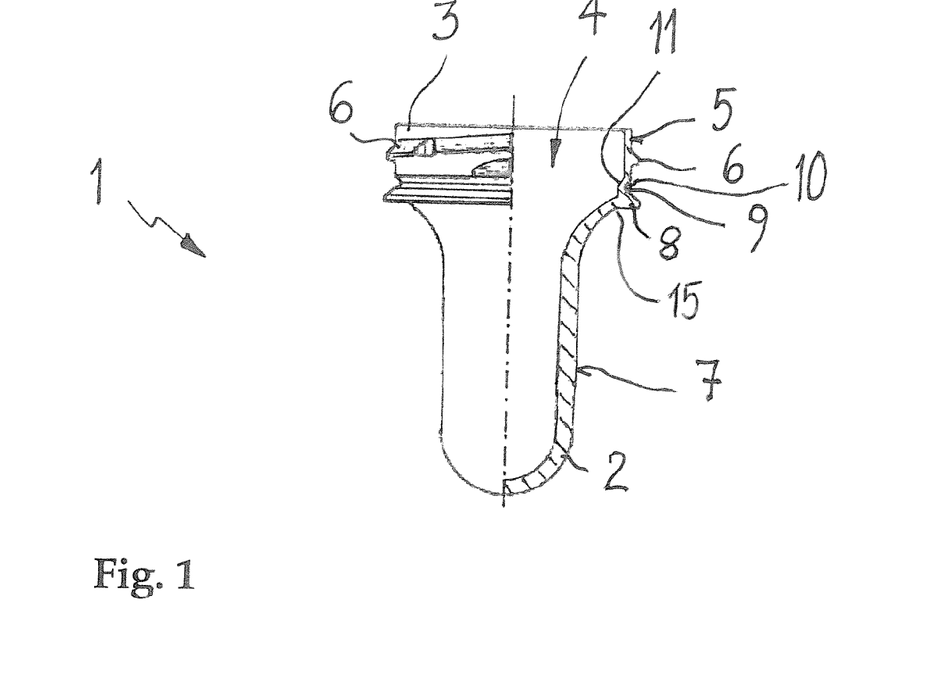
FIG. 1 shows an exemplary disclosed preform axially cut on half a side.

FIG. 1 shows an exemplary preform that is axially cut on half a side and that overall bears the reference number 1. The preform 1 can have an elongated preform body 2, whose one longitudinal end can be sealed. On its opposite end, the preform body 2 connects to a neck section 3, which can include a pour opening 4. The neck section 3 is provided on its outside wall 5 with threaded sections 6, which can be used with an inside threading for positive clamping of a screw cap, not depicted here. Further, it can be seen from the depiction that the preform 1 can have an annular rotating flange 8 at a transition 15 from the preform body 2 to the neck section 3, which flange projects radially from the jacket 7 of the preform body 2. The flange 8 can be used as a counter bearing for the separable safety band of a screw cap for a plastic container that is stretch-blow-molded from the preform 1 or in the case of oil bottles or the like for clamping the lower part of a hinge closure that can be used and in many cases is also referred to as a snap ring. In one area between the flange 8 and the threaded sections 6, the neck section 2 can have a peripheral annular groove 9, which is bounded by the flange 8 and by a setback 10 of the outside wall 7 of the neck part 3. The annular groove 9 can be used for the engagement of the usual transport means, for example, grippers, for the transport of the preform 1.

The preform 1 can be designed in one or more layers. All materials suitable for the injection-molding and stretch-blow-molding methods, for example PET, PET-G, HDPE, PP, PVC or else filled plastics, which can be produced at least partially from renewable raw materials, come into consideration. In accordance with an exemplary embodiment, the preform 1 can be produced in an injection-molding method.

Figure 2:
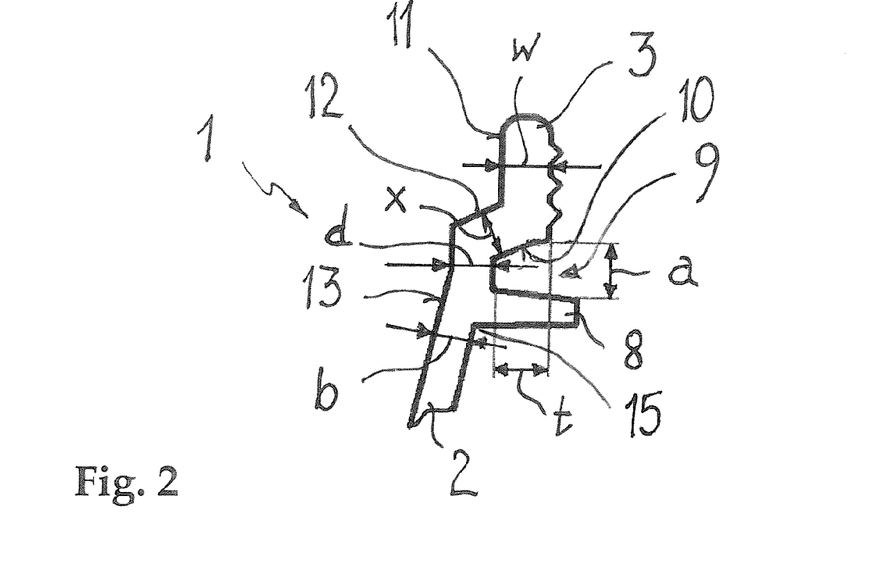
FIG. 2 shows an enlarged depiction of a neck section of the exemplary preform with an indicated preform body.

FIG. 2 shows the neck section 3 of the preform 1 on an enlarged scale. For the sake of greater clarity, hatching of the cutaway depiction was not done. The annular groove 9 can be bound by the flange 8 and by the setback 10 of the outside wall 7 of the neck section 3. Because of the annular groove 9, an annular circumferential inner collar 12 can be made on an inside wall 11 of the neck section 3, which collar can extend without undercuts into the inside wall 13 of the preform body 2. The annular groove 9 can be designed in such a way that the inner collar 12, seen in the direction of the preform body 2, can extend in front of or above the annular groove 9. In this connection, the inner collar 12 can extend parallel to the annular groove 9. According to the embodiment depicted, the inner collar 12 can be designed as an annular circumferential cone surface that forms an angle, for example, of approximately 100° to 150° with the inside wall 11 of the neck section. The inner collar 12 can be designed as a cone surface, which can be used in the case of the stretch-blow-molding method as a sealing surface relative to the opening of the blowing nozzle.

The inner collar 12 can extend essentially parallel to the outer collar 10. In this case, the outer collar 10 can be designed in steps. Accordingly, the inner collar 12 can also be designed in steps, whereby it can have at least one annular circumferential cone surface. In accordance with an exemplary embodiment, the inner collar 12, independently of the shape of the outer collar 10, can be designed as an annular circumferential cone surface.

With an axis of the preform, the outer collar 10 forms an angle that can be, for example, ±10° to ±60°.

The neck section 3 of the preform 1 can have a wall thickness w that is measured between the threaded sections 6 and that can be, for example, approximately 0.4 mm to approximately 2 mm. A wall thickness of the neck section 3, measured based on the annular groove, is provided with the reference symbol d in FIG. 2. The wall thickness d based on the annular groove 9 differs, for example, by not more than ±50% from the wall thickness w of the neck section 3 between the threaded sections 6. The wall thickness d based on the annular groove 9 preferably corresponds essentially to the wall thickness w between the threaded sections 6 or is slightly above it. A wall thickness x measured on the inner collar 12 extending above the annular groove 9 corresponds, for example, to essentially 0.5× to 1.5× the wall thickness w of the neck section 3 at the fastening means. In accordance with an exemplary embodiment, the wall thickness x at the inner collar 12 designed above the annular groove 9 corresponds essentially to the wall thickness w of the neck section 2 at the fastening means 6. A section of the preform body 2 that connects to the flange 8 can have a wall thickness that is provided with the reference symbol b and that can differ, for example, by no more than ±50% from the wall thickness w of the neck section 3 between the threaded sections 6. The wall thickness b of the section of the preform body 2 that connects to the snap ring 7 should essentially correspond to the wall thickness w of the neck section 3 between the threaded sections 6.

Relative to the outside wall 5 of the neck section 3, the peripheral annular groove 9 can have a maximum radial depth t, which can be, for example, approximately 0.1 mm to approximately 1.1 mm, for example, approximately 0.8 mm. A maximum axial width a that is measured in the axial direction of the preform 1 can be, for example, approximately 0.3 mm to approximately 3 mm, for example, approximately 1.5 mm. The peripheral annular groove 9 can be tapered in the direction of its base and can form a flowing transition to the outside wall 5 of the neck section 3.

Figure 3:
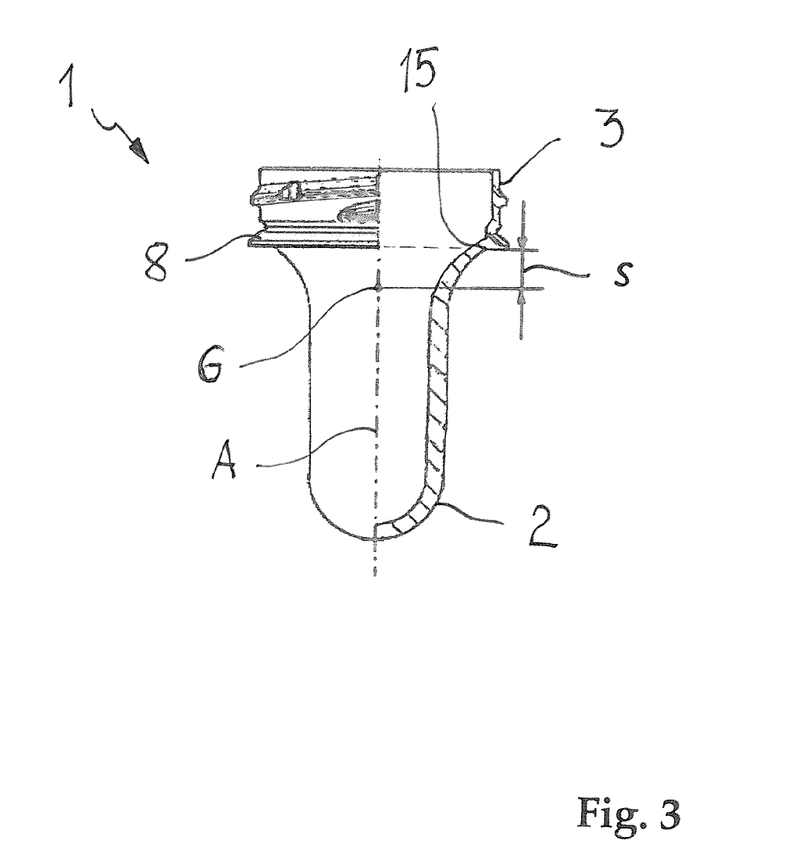
FIG. 3 shows the exemplary preform in a depiction analogous to FIG. 1 for explaining the center of gravity ratios.

The preform shown in FIG. 3 in a depiction analogous to FIG. 1 in turn bears the reference number 1 overall. Its preform body is provided with the reference number 2; the neck section behind it bears the reference number 3. The transition between the preform body 2 and the neck section is provided with the reference number 15 and is located at the discharge point of the, for example, radially-projecting flange 8 in the preform body 2. The preform 1 can have a center of gravity G that can be arranged in the area of the preform body 2 and can have a distance s from the transition 15 of the neck section 3 to the preform body 2 that can be greater than, for example, approximately 6 mm, for example, greater than 9 mm, and for example, preferably greater than 12 mm. Because the preform 1 in most cases is an essentially rotationally symmetrical body, the center of gravity G is usually in the range of a longitudinal axis, indicated in dashed-dotted lines, and provided with the reference symbol A, or a container center axis of the preform 1.

Figure 4:
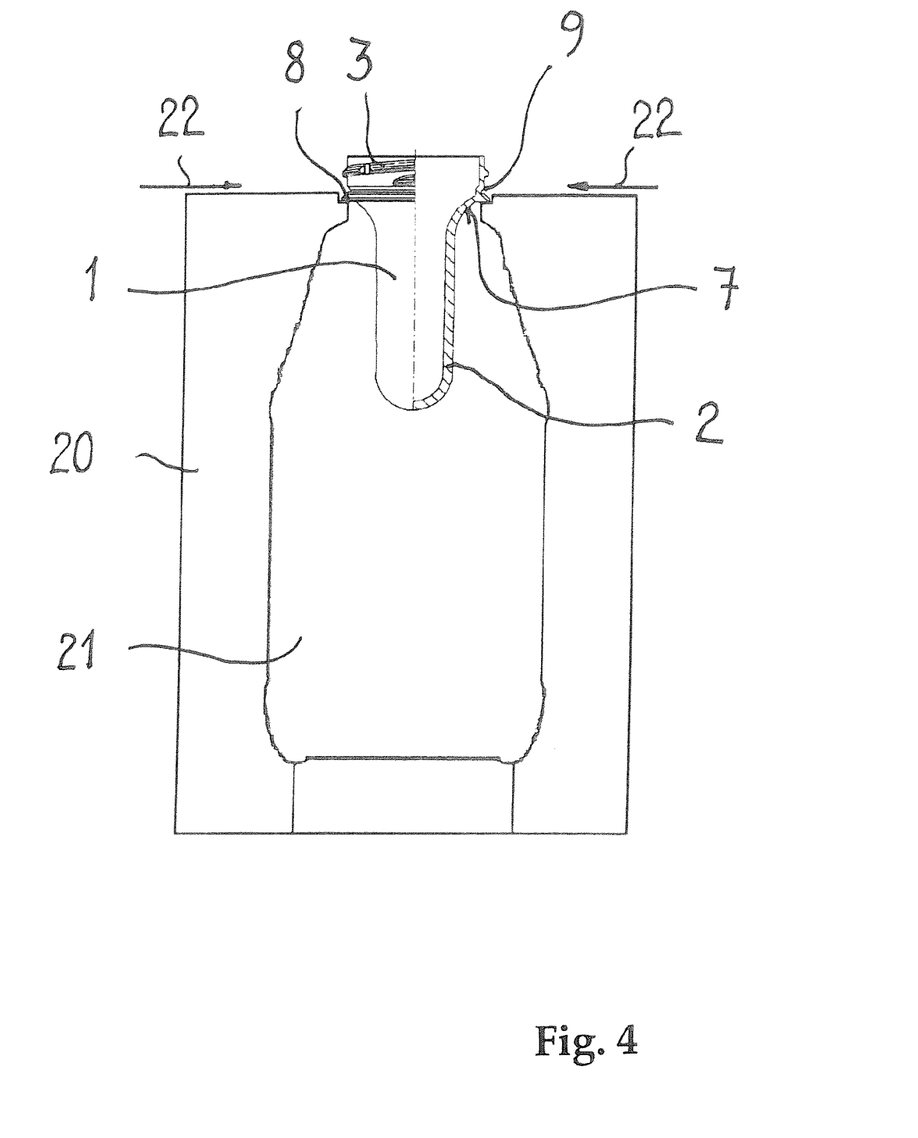
FIG. 4 shows an exemplary preform inserted into a mold cavity of a mold tool.

FIG. 4 diagrammatically shows a disclosed preform 1 that is inserted into a mold cavity 21 of a mold tool 20 of a stretch-blow-molding device. In FIG. 4, only a mold half of the mold tool 20 is depicted. The inserted preform 1 is depicted axially cut on half a side analogously to FIG. 1. The radial overlap of the flange 8, made on the preform 1, relative to the jacket 7 of the preform body 2 can be, for example, approximately 0.5 mm to approximately 20 mm. The large span of the radial overlap of the flange 8 can be produced from the variability of the outside periphery of the preform body 2. The smaller the outside periphery of the preform body 2, the larger the radial overlap of the flange 8 relative to the outside wall 7 of the preform body 2 in the case of a preset neck diameter. The smaller the outside diameter of the preform body 2, the less material can be used even in the case of larger wall thicknesses of the preform body 2. The radial overlap of the flange 8 can be sufficient for the preform 1 to be able to be supported on the mold tool 20 in the case of the stretch-blow-molding method, so that its neck section 3 projects from the mold cavity 21. The heated preform body 2 can be located inside the mold cavity 21 and can be axially and radially inflated by a medium injected with overpressure, for example, usually air. At the same time, the preform body 1 can be stretched in axial direction by a run-in elongated mandrel, not depicted here. After the elongation/blow-molding process, the finished plastic container can be demolded. The peripheral annular groove 9 that is made on the neck section 3 makes possible the engagement of known designed transport devices, for example grippers, for the transport of the preform 1 and the plastic container produced therefrom, which are shown in FIG. 4 by the arrows 22.

Figure 5:
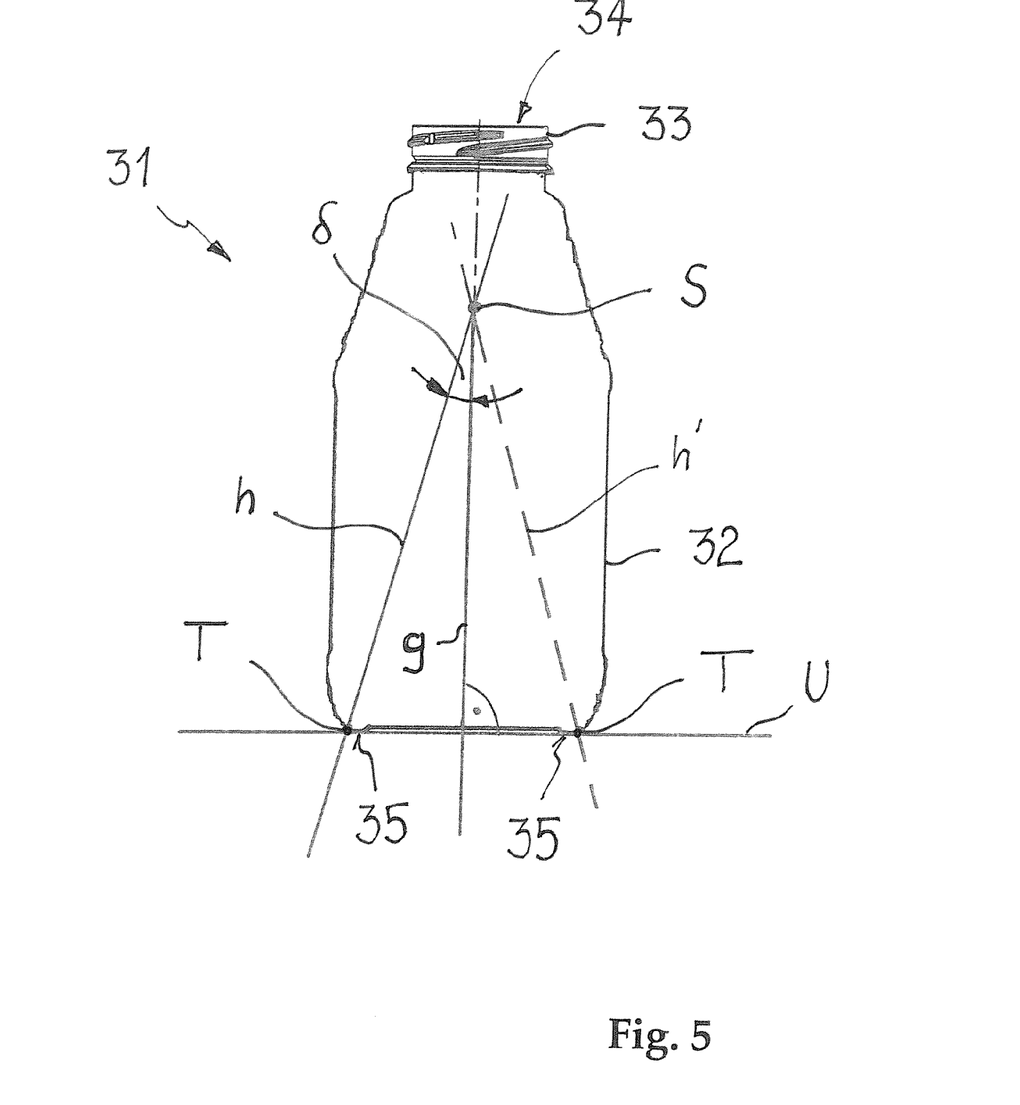
FIG. 5 shows a plastic container that is stretch-blow-molded from the exemplary preform for explaining the center of gravity ratios and the tipping stability.

FIG. 5 shows a plastic container, for example, a plastic bottle, which can be produced from a preform designed according to the disclosure in the stretch-blow-molding method and which is provided overall with the reference number 31. The plastic container 31 can have a container body 32, which can be sealed to a container base 30. The container body 32 can connect to a neck section 33, which can be provided with a pour opening 34 and which largely corresponds to the neck section of the preform, from which it can have been manufactured, which in most cases is no longer changed in the case of the stretch-blow-molding method and in many cases projects from the mold cavity during the stretch-blow-molding method. The plastic container 31 can have a center of gravity S, which is arranged in the area of the container body 32 based on the mass ratios between the neck section 33 and the container body 32. The center of gravity S of the plastic container 31 is arranged in the container body 32 in such a way that an imaginary first straight line g, which is perpendicular to a platform 35 made in the container base 30 and on which the center of gravity S lies, with an imaginary second straight line h, which is determined by a tipping point T and the center of gravity S that are predetermined in the area of an outer edge of the container base 30, form an angle δ with one another that can be, for example, greater than 12°. In a further exemplary embodiment of the plastic container 31, the angle δ that is formed by the first straight line g and the second straight line h can be greater than, for example, about 16°. Finally, in an exemplary embodiment of the plastic container 31, in which the angle δ that is formed by the first straight line g and the second straight line h can be, for example, greater than 20°, can be preferred.

In the case of most plastic containers, the first straight line g coincides with a longitudinal axis or a container center axis of the container 31. The tipping point T that lies on the second straight line h can correspond to a point on an outermost boundary line of a platform 35 of the plastic container 31, container on a base U, for example, a conveying surface of a conveyor belt. This is shown in FIG. 5 by another straight line h', which is embodied as a broken line. It is understood that the plastic container 31 can have a number of tipping points T along its platform 35 on the base U. The plastic container that is produced from the preform designed according to the disclosure can be designed in a largely rotationally-symmetrical manner. Its container body, however, can also have a cross-section, for example an oval cross-section, which departs from the rotational symmetry.

A preform according to the disclosure for the production of plastic containers, for example, plastic bottles, in a stretch-blow-molding method accordingly can have an essentially elongated preform body, whose one longitudinal end is made in a closed manner. At its opposite longitudinal end, the preform body connects to a neck section that can be provided with a pour opening and on whose outside wall fastening means for positive clamping of a closing part equipped with corresponding engagement means are made. The preform can have a center of gravity that can be arranged in the area of the preform body and can have a distance from a transition of the neck section to the preform body that can be greater than, for example, approximately 6 mm, for example, greater than 9 mm, and preferably greater than, for example, 12 mm. These ratios can be produced for example in the case of a preform without a support ring, which can have a rotating flange that is annular at least in some places at the transition from the preform body to the neck section and which flange radially extends above an outside wall of the preform body. In an area between the flange and the fastening means, the neck section can have a peripheral annular groove. The annular groove can be bounded by the flange and in the direction of the fastening means by an outer collar, which extends obliquely from a base of the annular groove to the outside wall of the neck section. The oblique outer collar forms a circumferential inner collar that is annular at least in some places on an inside wall of the neck section, which collar, seen in the direction of the preform body, extends axially above the annular groove and extends essentially without undercuts into an inside wall of the preform body.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A preform for the production of plastic containers in a stretch-blow-molding process, the preform comprising:
    an elongated preform body having a closed longitudinal end and an opposite longitudinal end connected to a neck section having a pour opening, the neck section having an outside wall with a fastening means for clamping of a closing part equipped with corresponding engagement means;
    a rotating flange at a transition from the preform body to the neck section, wherein at least a portion of the rotating flange is annular and radially extends above an outside wall of the preform body; and
    a peripheral annular groove, which is bound by the flange and in a direction of the fastening means by an outer collar, wherein the outer collar extends obliquely from a base of the annular groove to the outside wall of the neck section, which forms a circumferential inner collar, and wherein at least a portion of the inner collar is annular on an inside wall of the neck section, and wherein the inner collar in the direction of the preform body extends axially above the annular groove and into an inside wall of the preform body.

2. The preform according to claim 1, wherein the annular groove has a radial depth (t) relative to the outside wall of the neck section that is approximately 0.1 mm to approximately 1.1 mm.

3. The preform according to claim 1, wherein the annular groove has a maximum axial width (a) of approximately 0.3 mm to approximately 3 mm.

4. The preform according to claim 1, wherein the neck section on the base of the annular groove has a wall thickness (d) that corresponds to a wall thickness (w) of the neck section at the fastening means±50%.

5. The preform according to claim 4, wherein the wall thickness (d) of the neck section on the base of the annular groove corresponds to the wall thickness (w) of the neck section at the fastening means.

6. The preform according to claim 1, wherein a wall thickness (x) measured on the inner collar running above the annular groove corresponds to a wall thickness (w) of the neck section at the fastening means±50%.

7. The preform according to claim 6, wherein the wall thickness (x) measured at the inner collar that runs above the annular groove corresponds to the wall thickness (w) of the neck section at the fastening means.

8. The preform according to claim 1, wherein a section of the preform body connecting to the flange can have a wall thickness (b) that corresponds to a 0.5 times to 1.5 times wall thickness (w) of the neck section at the fastening means.

9. The preform according to claim 8, wherein the wall thickness (b) of the section of the preform body connecting to the flange corresponds to the wall thickness (w) of the neck section at the fastening means.

10. The preform according to claim 1, wherein the neck section has a wall thickness (w), measured at the fastening means, which is approximately 0.4 mm to approximately 2 mm.

11. The preform according to claim 1, wherein the annular groove is tapered radially to the base of the annular groove from the outside wall of the neck section.

12. The preform according to claim 1, wherein the inner collar that extends above the annular groove is designed in steps and includes at least one annular circumferential cone surface.

13. The preform according to claim 1, wherein the inner collar that extends above the annular groove is designed as a single annular circumferential cone surface.

14. The preform according to claim 1, wherein at least a portion of the inner collar extends parallel to the outer collar.

15. The preform according to claim 1, wherein the outer collar has a stepped outside contour.

16. The preform according to claim 1, wherein the outer collar with an axis of the preform forms an angle that is ±10° to ±60°.

17. The preform according to claim 1, wherein the preform is produced in an injection-molding method in one or more layers from a material of the group that consists of PET, PET-G, HDPE, PP, PS, PVC, copolymers of the cited plastics, bioplastics, PEF, filled plastics, and mixtures of the above-mentioned plastics.

* * * * *